March 7, 1967     F. F. STUCKI     3,307,405
FERRIMAGNETIC PRESSURE TRANSDUCER
Filed May 27, 1964     4 Sheets-Sheet 1

INVENTOR.
FRANK F. STUCKI
BY
*George C. Sullivan*
Agent

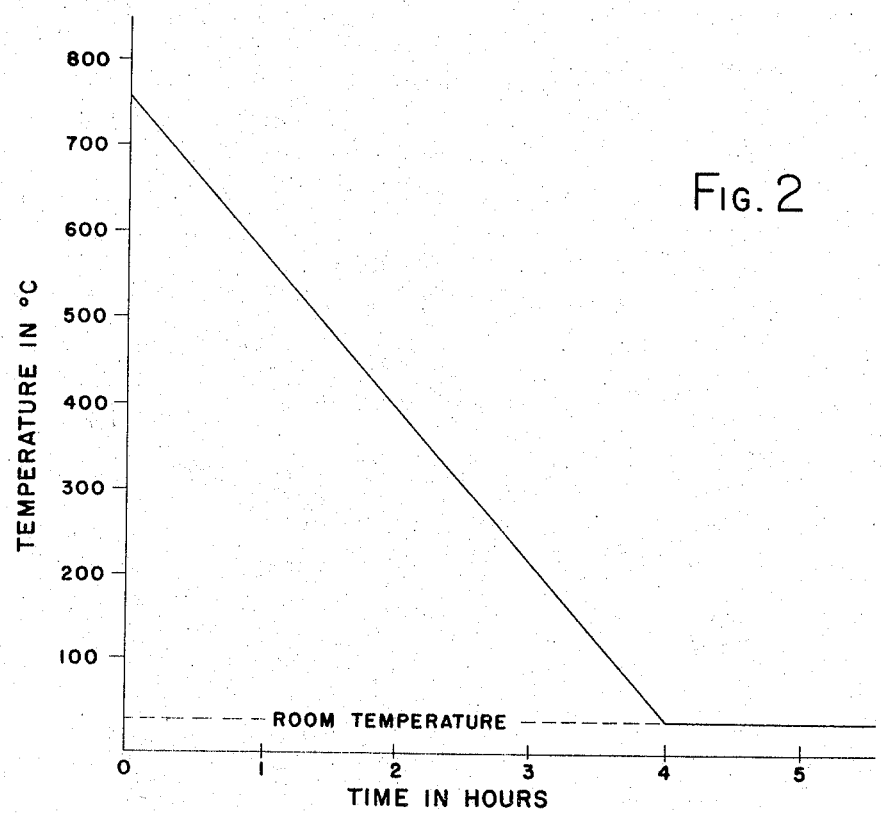
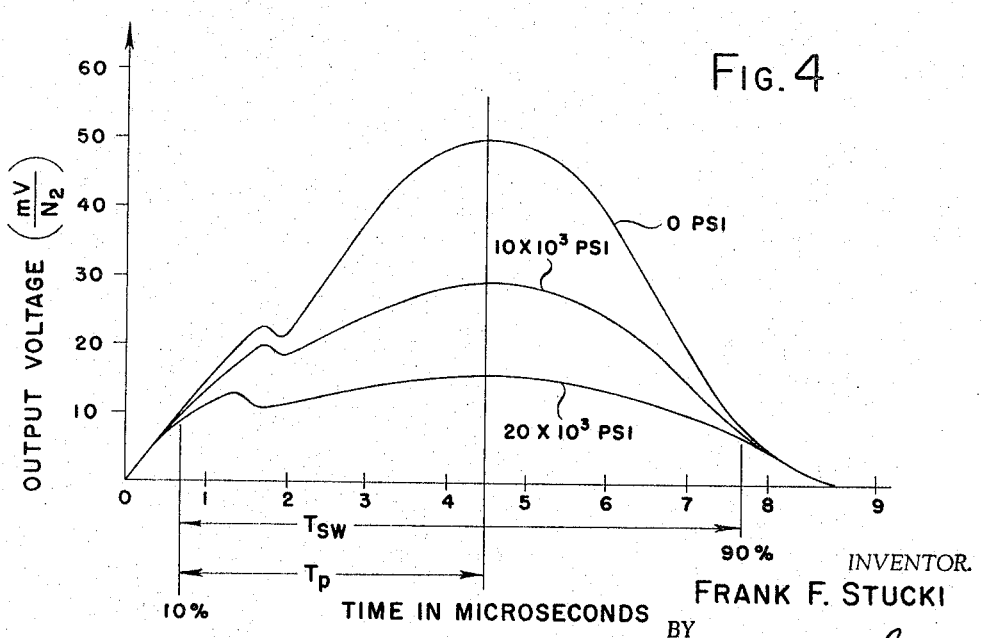

March 7, 1967  F. F. STUCKI  3,307,405
FERRIMAGNETIC PRESSURE TRANSDUCER
Filed May 27, 1964  4 Sheets-Sheet 3

INVENTOR.
FRANK F. STUCKI
BY
George L. Sullivan
Agent

March 7, 1967 F. F. STUCKI 3,307,405
FERRIMAGNETIC PRESSURE TRANSDUCER
Filed May 27, 1964 4 Sheets-Sheet 4

INVENTOR.
FRANK F. STUCKI
BY
George Sullivan
Agent

United States Patent Office 3,307,405
Patented Mar. 7, 1967

3,307,405
FERRIMAGNETIC PRESSURE TRANSDUCER
Frank F. Stucki, Palo Alto, Calif., assignor to Lockheed Aircraft Corporation, Burbank, Calif.
Filed May 27, 1964, Ser. No. 370,498
9 Claims. (Cl. 73—398)

The present invention relates to a ferrimagnetic pressure transducer and more particularly to a microminiature pressure transducer having a sensing element of ferrimagnetic material which is unusually sensitive to hydrostatic and unidirectional pressures which has resulted from elevating the Curie temperature of the material to thereby greatly enhance the stress or pressure sensitivity thereof.

In the prior art, devices for measuring both hydrostatic and unidirectional pressures are well known and provide useful and convenient devices for measuring such pressures under a variety of conditions. The pressure transducers of the prior art have taken various forms and utilized various materials as the sensing element in such devices. For example, silicon and germanium diodes have been found to be rather sensitive for pressure sensing devices and utilize a characteristic called "tunnel effect" to effectuate the sensing process. In U.S. Patent No. 3,065,636, issued to W. G. Pfann on November 27, 1962, there is disclosed a pressure transducer for measurements of pressure accomplished through the use of current induced in the diodes resulting from fluctuations in pressure levels applied to the transducers. The currents generated in the device are predominantly generated by a mechanism called "internal field emission." One disadvantageous characteristic of this prior art type of device stems from the fact that its voltage output versus pressure sensitivity has a positive slope and as such tends to be an inherently unstable device at high pressures because the output current is a direct function of the applied pressure. Stated differently, the greatest output occurs at the highest pressures, thus offering an opportunity for a greater margin of error in the readings of pressures measured. In many present day applications there are requirements for transducers which have only a small percent of the size of prior art devices. For example, a long-standing need has existed for a transducer which may be utilized to measure pressure or stress of the juncture between two dissimilar materials having different coefficients of expansion. In addition to smallness in physical size, there is also a need for a transducer which is rugged, substantially temperature insensitive, and radiation resistant. Heretofore available sensing elements or devices have not exhibited all of the foregoing properties.

While the known prior art pressure transducers have been restricted to the use of non-ferrimagnetic materials as the pressure sensitive element in such transducers, it nevertheless has been recognized that certain isolated metallic ferro-magnetic materials exhibit a limited amount of pressure sensitivity. In instances where such ferrites have exhibited any pressure sensitivity characteristics it was considered extremely undesirable. This was especially so where such ferrites have been used as magnetic memory cores. Thus, considerable emphasis has been directed toward the improvement of their magnetic qualities solely, and the elimination of all stress characteristics, including magneto-strictive stress effects, has been sought. Consequently, the major portion of this effort to improve memory cores has been expended to eliminate stress sensitivity characteristics. These lower level stress properties have been successfully reduced or eliminated by magnetically annealing such cores to impart preselected magnetic properties to the material at ambient temperatures.

More particularly, it has been determined that substantial elimination of stress sensitivity in the ferrimagnetic cores occurs when the coercive force characteristic of the B-H loop of the material is low. The lower coercive force characteristic enables such devices to operate at lower power levels when employed as switching or memory elements in a computer application. Furthermore, when such cores have been thermo-magnetically treated to alter the hysteresis loop by lowering the coercive force thereof, such materials have a Curie point no greater than 400° C. Thus, in the prior art, emphasis has been placed on trying to provide a magnetic core which may be used as a magnetic memory or switching element, as opposed to considering such devices as elements utilized in transducers for determining hydrostatic or unidirectional stresses or pressures. Stated in a different manner, the prior art has worked toward the elimination of a property in ferrites which has been found to be extremely important for the present invention.

Owing to the small physical size and ruggedness of magnetic cores, they have been discovered as ideal for use as a sensing element in pressure transducers. It also has been discovered that when such cores possess high pressure sensitivity characteristics, they make excellent elements for pressure transducers. More particularly, it has been discovered that a small-size core on the order of 50 mil may be embedded in such materials as thermosetting plastic, prestressed concrete, and the like, to measure internal stresses developed in such materials as they solidify. Measurement of these internal stresses is accomplished without significant side effects due to the presence of the core embedded in the material. In addition, it has been found that additional internal stresses which develop in such materials due to radio-active irradiation, expansion and contraction, etc., of the material can be readily measured with these cores. The output from such measurement has a linear proportionality to the magnitude of the stress generated within such material under the aforementioned conditions.

It should be noted at this point that the pressure sensitive toroid cores according to the present invention are not only sensitive to static pressures, but are capable of detecting pressures in the form of high shock waves of long or short duration, and at high repetition rates. Thus, they are suited for explosive or acceleration measurements as well. Consequently, the present invention overcomes many of the problems heretofore associated with prior art pressure transducers and provides a tool which fills a long-standing void in the prior art by providing a pressure transducer element of small physical size, rugged, temperature insensitivity, radiation resistant, economical in cost of manufacture and simplicity of operation and application.

Accordingly, one primary object of the present invention is to provide ferrimagnetic cores with high pressure sensitivity.

A further object of the invention is to provide ferrimagnetic core materials which have high Curie temperatures heretofore considered undesirable when associated with magnetic cores.

Yet another object of the invention is to provide ferrimagnetic core materials of small physical size for sensing elements in a microminiature pressure transducer which is unusually economical to produce.

Still another object of the invention is to provide ferrimagnetic core materials for microminiature pressure transducers which are readily reproducible.

As used in the specification and claims, the term "Curie temperature" is intended to be understood as the temperature above which the magnetic domain of the ferrimagnetic material exhibit a random distribution, or no prefered alignment, and thereby loses its magnetism. At the Curie temperature, such ferrimagnetic materials exhibit an inability to produce an output when used as a transformer element. Thus, when the ferrimagnetic material is elevated to its Curie temperature, and then subjected to an applied magnetic field of a prescribed magnitude and then cooled to room temperature, the magnetic domains of the material exhibit a preferred alignment along the path of the applied field lines. This preferred alignment of the magnetic domains in the material is commonly termed "anistrophy in the material."

The foregoing and other objects of this invention may be achieved by magnetically annealing in an air atmosphere or other annealing media a ferrite material with significant amounts of nickel at an elevated temperature and cooling the same to room temperature for a preselected period of time. The composition of ferrite material containing only nickel in significant amounts has been used primarily as a hydrostatic pressure sensing element, while the use of other preselected ingredients, such as lithium and cobalt in preselected lesser amounts with the nickel, produces a core which measures unidirectional pressures.

More specifically, the ferrite core materials are processed by elevating the cores to a temperature of about 750° C. and holding them there for a preselected time while simultaneously applying a magnetic drive thereto in the form of an input signal and monitoring the same until the cores exhibit no magnetic properties, then cooling the core to room temperature during a preselected period of time while maintaining a magnetic drive of prescribed magnitude on the core. The resulting process shifts the Curie temperature to at least 750° C., resulting in a pressure sensitivity which is substantially linear over a range of at least 20,000 p.s.i. when hydrostatic pressure is applied to a core, or at least 100 p.s.i. when unidirectional pressure is applied. Stress measurements utilizing the cores are made by applying an input signal to a primary coil wound thereon and recording the pressure applied thereto, which generates a current in a secondary output coil also wound on the core.

The novel features which are believed to be characteristic of the invention both as to its organization, method of fabrication and operation, together with further objects and advantages thereof will be further understood from the following description in connection with the accompanying drawings in which illustrative embodiments of the invention are disclosed by way of example. It is expressly understood, however, that the drawings are for purposes of illustration only and do not define limitations of the invention.

In the drawings:

FIGURE 2 is a plot of the cooling cycle of the magnetically annealed ferrimagnetic cores in accordance with the present invention.

FIGURE 4 is a plot of the output waveform of different pressures applied to a typical transducer versus time illustrating the switching time of the core.

Figure 1:
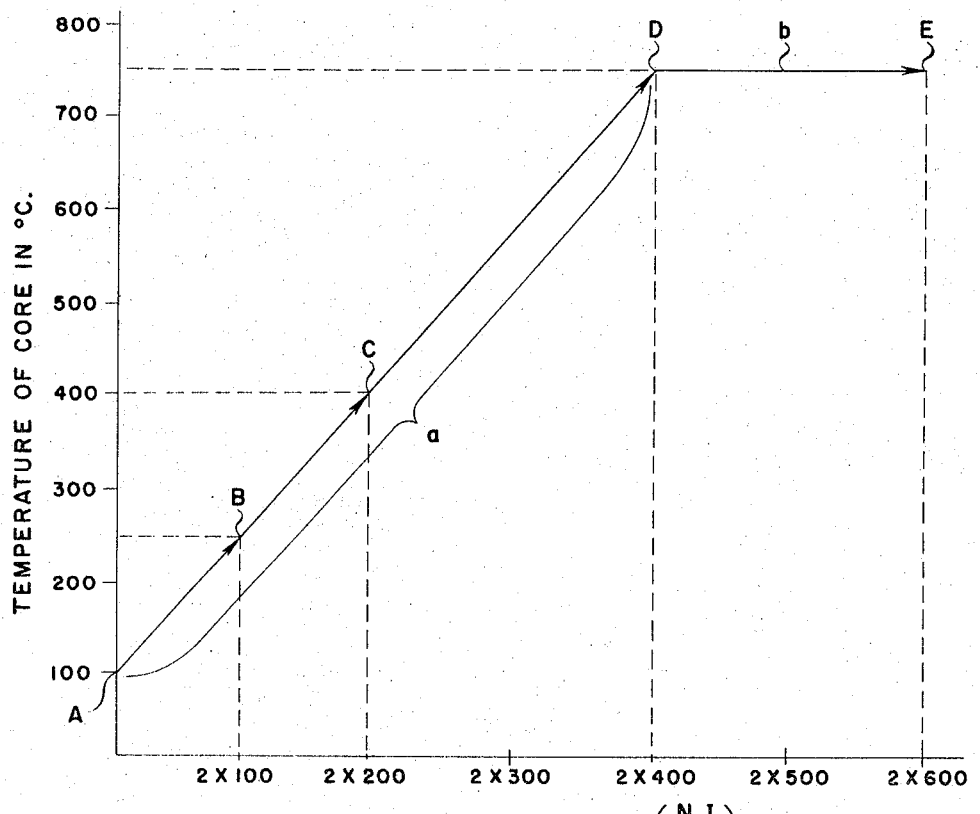
FIGURE 1 is a plot of the magnetic annealing cycle for raising the Curie temperature of ferrimagnetic cores in accordance with the present invention.

The initial steps used for preparing ferrite materials in accordance with this invention do not differ significantly from well known procedures for preparing other ferrites. For example, the normal steps required in preparing such ferrites include mixing, calcimining, regrinding, adding binders, granulation and pressing, and are performed in the usual and well known manner. However, in accordance with this invention, further processing is required to impart the pressure or stress sensitivity characteristic to the ferrite material.

Before discussing the annealing process for the cores formed, the composition of the ferrite materials will be discussed. The composition of material which has been found to respond to magnetic annealing for shifting the Curie ($T_c$) temperature is slightly different for a hydrostatically sensitive core and a unidirectionally sensitive core. The latter core is also termed a "point-to-point sensitive core." For the hydrostatically sensitive core, a useable prefered range of compositions, in percent by weight, is $0.5\ NiFe_2O_4 + 0.5\ Fe_3O_4$ to $0.6\ NiFe_2O_4 + 0.4\ Fe_3O_4$. For the unidirectionally sensitive core, the composition of the materials includes, $0.01\ Co + 0.49\ NiFe_2O_4 + 0.5\ Fe_3O_4$ and $0.01\ Li + 0.49\ NiFe_2O_4 + 0.5\ Fe_3O_4$. Although the compositions set forth hereinabove have been found to respond satisfactorily to the annealing process in accordance with the present invention for shifting of the Curie temperature to a value of at least 750° C., it is expressly understood that they are not intended as a limitation of the invention. More particularly, the composition of materials used is important to the successful operation of the invention, but it is believed that the novelty thereof resides in the magnetic annealing technique utilized in shifting the Curie temperature to an elevated level which was heretofore considered undesirable, and the discovery or recognition that this heretofore undesirable characteristic could be utilized to provide a device having unobvious utility to provide heretofore unappreciated or unknown results when so utilized.

By way of illustration of an example of a hydrostatically sensitive core prepared in accordance with this invention, the composition of the material in percent by weight comprised $0.60\ NiFe_2O_4 + 0.40\ Fe_3O_4$. The material was in the form of a 50 mils outside diameter and 28 mils inside diameter toroidal core 10 mils thick. It is expressly understood that the size of the core is not to be considered as a limitation of the invention. More specifically, it has been found that suitable cores in the range of 20 mils to 150 mils outside diameter and about 10 to 20 mils thick all respond to this Curie temperature shifting process and thereafter are pressure sensitive according to the present invention. Thus, if a limitation exists, it arises from an applicational consideration; that is, the size of the core becomes the limiting factor when it is so large in size that it causes a distortion of the material in which the core may be embedded for internal stress measurements or when it is utilized to measure stresses developed at the juncture between two dissimilar materials. The largeness in size of the core may render the recorded measurements meaningless.

Referring now to FIGURE 1, there is shown a typical annealing curve illustrating the relationship between the actual temperature in degrees centigrade to which the ferrimagnetic core is subjected versus the magnetic drive, expressed in terms of ampere turns (NI) divided by the median circumferential length (1) of the core applied to the core during annealing. In addition to the temperature versus magnetic drive shown in FIGURE 1, there are shown several significant points along the plot of the curve generally designated $a$. More specifically, point A, which is on the order of 100° C., is commonly called the intrinsic Curie temperature of commonly available ferrimagnetic materials heretofore known in the prior art. In accordance with the present invention, this point has been designated as the starting point for unannealed cores. Point B along the part *a* of the plot represents the point where the square loop characteristics of a ferrimagnetic material is first observed, and is traditionally used as a starting point for fabricated square loop magnetic cores which may be used primarily for memory cores in computer applications.

Continuing along part *a* of the plot, a third point C is encountered at about 400° C., which has been considered in the prior art as a very significant one, in that it is the Curie point for prior art square loop cores utilized for magnetic memory cores. Point C also represents the point of low coercive forces characteristic for the core mentioned hereinabove. Continuing along part *a* of the plot, point D is encountered at about 750° C., which is the preferred highest elevated temperature to which the core is subjected during the annealing process, in accordance with the present invention. It has been found that there is no advantage in raising the temperature of the core to a higher level. The temperature of 750° C. set forth for illustrative purposes is maintained for a preselected period of time while the magnetic drive is increased to a maximum of about 1200 milliampere turns at point E from 800 milliampere turns at point D. Since the number of input turns is two in this embodiment, the total drive ampere turns is 1200 or 800 milliampere turns. Subsequently, the core is slowly cooled to room temperature or about 20° C. in accordance with the plot illustrated in FIGURE 2 with a magnetic drive on the order of 800 milliampere turns. The core is now ready for use as the heart of a micro-transducer.

Figure 3:
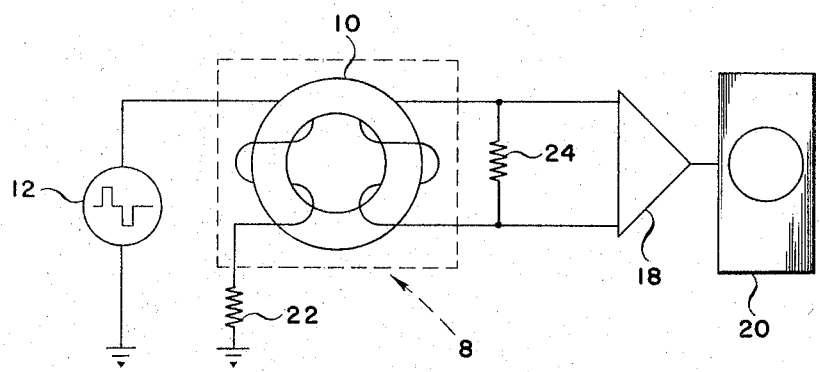
FIGURE 3 is a schematic circuit diagram illustrating the manner in which an input signal is coupled to the ferrimagnetic core and the manner in which an output is coupled therefrom for display purposes.

With reference to FIGURE 3, there is shown a schematic circuit diagram illustrating the manner in which a microtransducer 8 including a pressure sensitive core 10 excited by a pulse generator 12 connected through a primary coil 14 of two turns wound on core 10 and a secondary coil 16 of ten turns may be utilized for stress measurements. It should be noted that the use of two turns for the primary coil and ten turns for the secondary coil are examples and should not be interpreted as a limitation. As a further example, greater output may be obtained by adding turns to the secondary coil. In certain application this may be advantageous in that it may tend to mask the noise associated with the output signal.

In a typical application, transducer 8 may be embedded in an epoxy, the internal stresses generated within the epoxy during its curing period may be observed by monitoring an output voltage induced in the secondary coil 16, wound on core 10. The output signal is fed to an amplifier 18 for presentation on a conventional oscilloscope 20. Resistor 22 is connected between coil 14 and the ground, and is employed to produce a current source in conjunction with signal source 12 as opposed to a voltage source, and a resistor 24 is connected in parallel with the secondary coil 16 and is employed as a termination resistance to provide optimum output to the amplifier 18.

With the arrangement shown in FIGURE 3, core 10 may be introduced into a hydrostatic environment to measure statically applied pressures or stresses, or pulse type pressures, such as explosions or high energy shock pulses of short durations. The measurement of explosive or high shock pulses is possible owing to the fact that the switching time of the output signal from core 10, when excited by a square wave initiation pulse having a response on the order of several microseconds is less than one microsecond and substantially constant for different pressure values. The process of triggering or switching the core is accomplished by a positive pulse called a "set pulse" and switched back to the original state by a reset negative pulse. In general, the set and reset pulses constitute one cycle for switching the core.

Referring to FIGURE 4, there is shown a part of the output waveform for different pressures in pounds per square inch applied to a typical transducer 8 in a hydrostatic environment versus time in microseconds illustrating the switching time ($t_{sw}$) or response of the core 10 when a set pulse on the order of one microsecond at a rate of 300 kilocycles per second is applied. The significance of this plot resides in the fact that the switching time ($t_{sw}$) of core 10 is substantially the same at all pressures within the measured range of 0 to $20 \times 10^3$ pounds per square inch, and reaches a maximum voltage output ($t_p$) at substantially the same time for each measurement. In addition, it should be noted that each plot reaches the same value at the 10 percent and 90 percent points. This illustrates the fact that the core switches at about the same point irrespective of the pressure applied.

Figure 5:
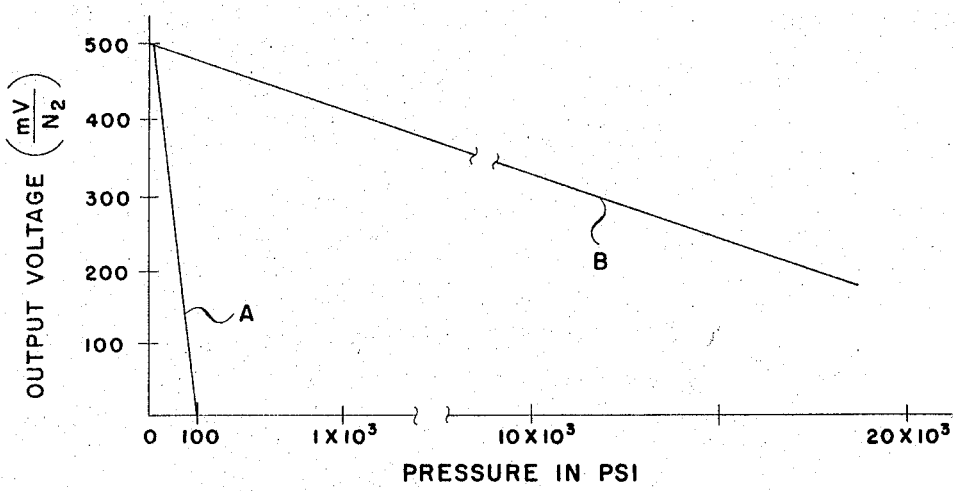
FIGURE 5 is a plot of the output voltage of a magnetic core as a function of an applied hydrostatic or unidirectional pressure.

Discussion of the invention will be continued with reference to FIGURE 5 where there is shown a plot of the output voltage in millivolts per turn $$\left(\frac{MV}{N}\right)$$

of both types of magnetic transducer cores as a function of an applied hydrostatic and unidirectional pressure which illustrates their negative pressure characteristics. Thus, it can be seen from FIGURE 5 that the maximum output from both pressure transducers occurs when no pressures are applied to the transducer and the output generated by the transducer decreases with increasing pressures. Tests made with typical transducers reveal that the cores exhibit no mechanical hysteresis as one subjects them to pressures from 0 to 100 p.s.i. for the unidirectional core or from 0 to greater than 20,000 p.s.i. for the hydrostatic core, curves A and B, respectively. The process is reversible without any evidence of discontinuity or mechanical hysteresis. Thus, it can be seen that the hydrostatic magnetic core is capable of withstanding repetitious stress events of large magnitudes without being physically affected thereby. Advantageously, this characteristic in conjunction with high switching rate of the core will enable the core to be utilized as a transducer element in such applications as accelerometers, explosion detectors in automobile cylinder chambers, underwater shock detection devices, and the like.

Particular note should be made at this point to curve A of FIGURE 5, which illustrates the unidirectional sensitive core. It can readily be appreciated from curve A that the sensitivity of the unidirectional core is greater than that of the hydrostatically sensitive core. Stated differently, the voltage output per pressure range (mv./p.s.i.) for curve A is greater than curve B. From an application point of view, it can be seen from the curves shown in FIGURE 5 that a unidirectional core has greater utility for application where the pressure applied is less than 100 pounds per square inch.

Figure 6:
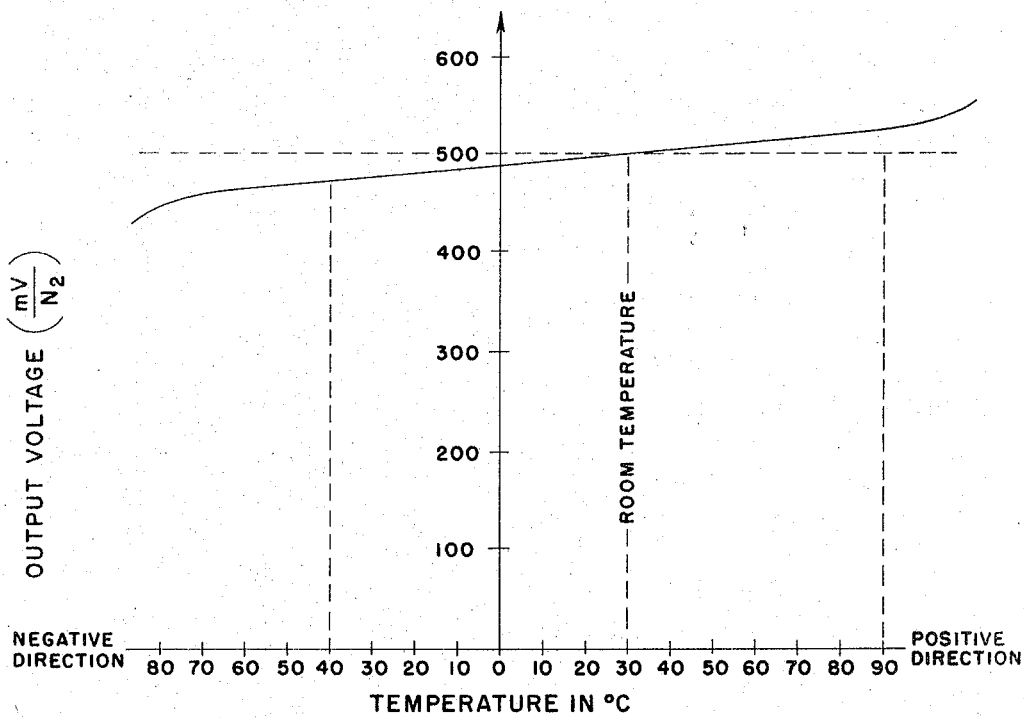
FIGURE 6 is a plot of the output voltage of a magnetic core over a preselected temperature range illustrating the linearity of the output response.

Referring now to FIGURE 6, there is shown a plot of the voltage output of a magnetic core versus a preselected temperature range illustrating the linearity of the output response. The relative linear characteristic of the core illustrated in FIGURE 6 is applicable for both unidirectional and hydrostatically sensitive cores. As shown, the plotted curve is substantially flat in the −40° C. to +90° C. With room temperature as a reference, the variation has been found to be less than plus or minus 3 percent. Thus, it can be seen that the cores may be used over a wide range of temperature, wherein the change in linearity of output over the temperature range is plus or minus three percent from the output value at room temperature.

Figure 7:
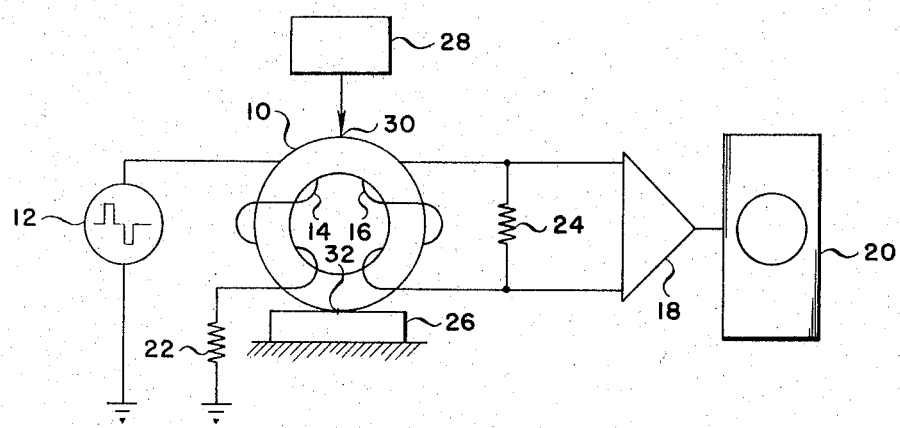
FIGURE 7 is a schematic diagram illustrating another embodiment of the invention for measuring unidirectional pressure.
Figure 8:
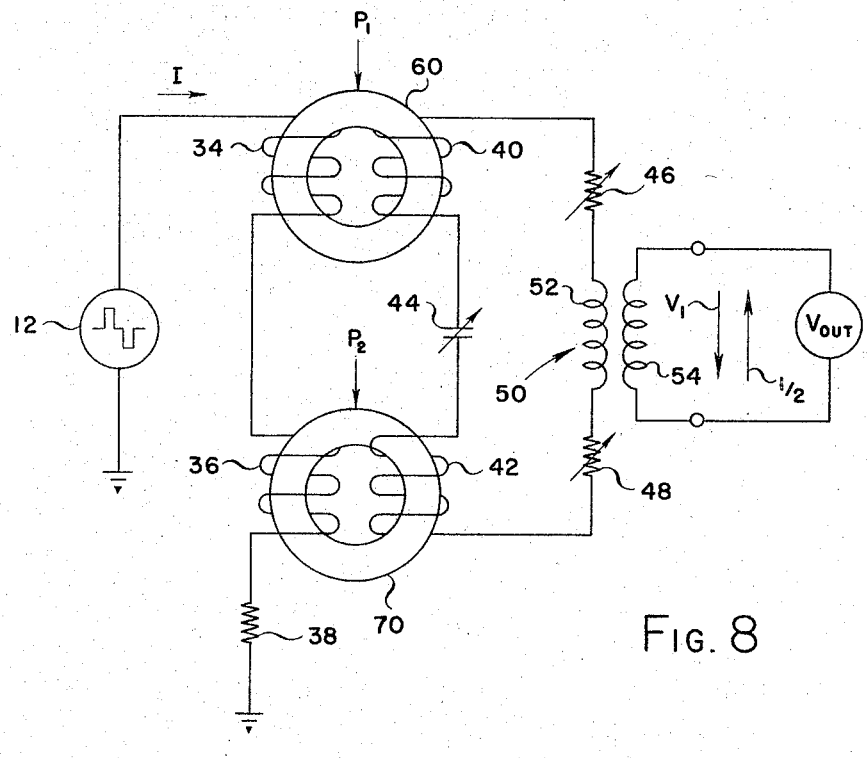
FIGURE 8 is a schematic circuit diagram illustrating another embodiment of the invention for measuring differential pressures.

The description of the present invention will be concluded with a discussion of FIGURES 7 and 8. In FIGURE 7 there is shown an embodiment of the invention employing a transducer including the same means for coupling a signal to and from core 10 as illustrated in FIGURE 3. In addition, there is shown a fixed support 26 and an applied weight 28. The force from weight 28 acting upon the core is directed along an imaginary line between points 30 and 32 across the diameter of the core 10. Maximum sensitivity is obtained when points 30 and 32 are 180 degrees apart.

In FIGURE 8 there is shown another embodiment of the invention wherein two transducers are employed to provide a differential pressure reading which enhances the sensitivity of the transducer. The arrangement shown in FIGURE 8 includes a pair of cores 60 and 70 connected in series by primary coils 34 and 36 respectively for receiving an input signal which is in turn connected in series with signal generator 12 and resistor 38 to provide a current source. A pair of secondary coils 40 and 42 are connected in series with a variable capacitor 44, a pair of variable resistors 46 and 48, and the primary coil 52 of a transformer 50. The output from the arrangement is measured across secondary coil 54 of transformer 50.

The output voltage of coil 54 is represented by $V_1$ and $V_2$ which correspond to the respective pressures $P_1$ and $P_2$. The actual voltage readout is the difference between $V_1$ and $V_2$; that is, a differential voltage.

The arrangement shown in FIGURE 8 is equally applicable to both hydrostatically and unidirectionally sensitive cores. In operation, there is no output across coil 54 when both cores 60 and 70 are subjected to the same pressure or stress. However, when their is a difference in pressure applied to the cores, this difference constitutes an output. The advantage of this embodiment arises from the fact that small pressure differences at high pressures or stresses, for example, 10,000 p.s.i., can be readily made. Thus, one transducer is subjected to a known pressure and the other is subjected to an unknown pressure within several hundred p.s.i. of the known pressure. The output will be a direct reading of the difference therebetween and will be more accurate than any attempt to measure the unknown pressure directly. This is especially true when the pressure differential is small and at high levels.

In practice, it has been found that the utilization of the basic concepts herein set forth will provide ferrimagnetic pressure transducers which are capable of operating in a number of applications to provide data of pressures and stresses associated with numerous devices, materials and environments heretofore unavailable in the prior art. In addition, the cost of manufacturing transducers according to the present invention is unsually economically and reproducible with excellent yield. The illustrative embodiments of the invention should not be interpreted as a limitation of the invention. For example, it is understood that the present invention may be utilized as an accelerometer, microphone, recording pickup and the like when considered in connection with FIGURE 7 where the point-to-point or unidirectional core is employed for pressure or stress measurements.

While the ferrimagnetic pressure transducers of the invention have been described with reference to only a few applications, it is to be understood, of course, that alterations and modifications may be made in the applications shown or discussed without departing from the spirit and scope of the invention. Accordingly, it is expressly understood that the foregoing description shall be interpreted only as illustrative of the invention and that the spirit and scope of the invention is to be limited only by the appended claims when accorded the broadest interpretation consistent with the basic concepts taught herein.

What is claimed is:

1. A ferrimagnetic transducer for measuring hydrostatic or unidirectional pressures comprising a ferrite core having a Curie temperature of at least 750° C., which causes said core to be pressure-sensitive, pulse generating means electrically coupled to said core for energizing and de-energizing said core, and means magnetically coupled to said core for measuring an output signal therefrom which corresponds to the magnitude of pressure exerted on said core, said output signal being substantially proportional to the exerted pressure.

2. A ferrimagnetic transducer for measuring static and dynamic pressures comprising a nickel ferrite core having a Curie temperature of at least 750° C., which causes said core to have substantially linear pressure sensitivity and output response in the range of 0. to 20,000 pounds per square inch, pulse generating means electrically coupled to said core for generating magnetic flux lines in said core and removing the same, and means magnetically coupled to said core for measuring an output signal induced therein which corresponds to the magnitude of the pressure exerted on said core.

3. A ferrimagnetic transducer for measuring hydrostatic pressures comprising a nickel ferrite core having a composition of $0.5\ NiFe_2O_4 + 0.5\ Fe_3O_4$ by weight and a Curie temperature of at least 750° C., a pulse generating means electrically coupled to said core generating magnetic flux lines in said core and removing the same therefrom, and means magnetically coupled to said core for measuring the output signal generated in said means which corresponds to the magnitude of pressure exerted on said core, said output signal being substantially linearly proportional to the exerted pressure.

4. A ferrimagnetic transducer for measuring unidirectional pressures comprising a nickel ferrite toroid core essentially composed by weight of $0.49\ NiFe_2O_4 + 0.5\ Fe_3O_4 + 0.1$ of metal from the group consisting of lithium and cobalt and having a Curie point of at least 750° C., pulse generating means electrically coupled to said core for generating magnetic flux lines in said core and removing the same therefrom, and means magnetically coupled to said core for measuring an output signal generated therein which corresponds to the magnitude of the unidirectional pressure exerted on said core along an imaginary line which extends between two points on a diameter of the core, said output signal being substantially proportional to the exerted pressure.

5. In a differential pressure measuring device adapted for measuring hydrostatic or unidirectional pressures, the combination comprising a pair of transducers each having a toroid core made of nickel ferrimagnetic material and processed so as to have a Curie temperature of at least 750° C., an input coil wound on each core, said coils being connected in series with a resistor and signal source to thereby provide a current source, a secondary coil wound on each core and connected in series with a variable capacitor, a pair of variable resistors, and a primary winding of a transformer, and a secondary winding of said transformer for measuring the magnitude of differential pressure exerted on said pair of transducers, said differential pressure being derived from the application of a known static pressure to one of said transducers and the application of an unknown pressure to said other transducer of said pair of transducers.

6. Means for measuring hydrostatic and dynamic pressures comprising a ferrimagnetic core having a Curie temperature of at least 750° C., a primary coil wound on said core and connected in series with a resistor for receiving a current input signal, a secondary coil wound on said core having a resistor connected in parallel therewith for impedance matching, a signal source connected in series with said primary coil and series resistor for generating high frequency signal having positive and negative pulses which constitutes one cycle, said signal source generates magnetic flux line in said core during the positive half of said cycle and removes the same during the negative half of said cycle, said secondary coil couples an output signal from said core which is proportional to the pressure exerted on said core, and readout means connected to said secondary coil for measuring the output coupled from said core.

7. A device comprising a pair of pressure transducers having a pair of ferrimagnetic cores having a Curie temperature of at least 750° C., thereby causing said cores to be sensitive to pressures exerted thereon, input coils connecting said cores in series and coupled thereto for receiving an excitation signal and a pair of output coils wound respectively on the cores connecting them in series with one another and in series with a variable capacitor, a pair of variable resistors and the primary coil of a transformer, a secondary winding of a transformer cooperating with the output winding and said primary coil to provide a means for measuring a differential pressure resulting from different pressures being exerted on said cores and permitting the measurement thereof.

8. The device defined in claim 7 wherein said pair of cores are further defined as being capable of solely measuring unidirectional pressures exerted thereon and directed along at least one diameter of the core.

9. The device defined in claim 7 wherein said pressure sensitive cores are further defined as being essentially adapted to measure only hydrostatic pressures.

References Cited by the Examiner
UNITED STATES PATENTS

| | | | |
|---|---|---|---|
| 2,460,076 | 1/1949 | Emerson | 73—398 |
| 3,078,234 | 2/1963 | Davis | 252—62.5 |
| 3,168,830 | 2/1965 | Chass | 73—398 |
| 3,229,524 | 1/1966 | Jewell | 73—398 |

LOUIS R. PRINCE, *Primary Examiner.*

D. O. WOODIEL, *Assistant Examiner.*